Figure 2:
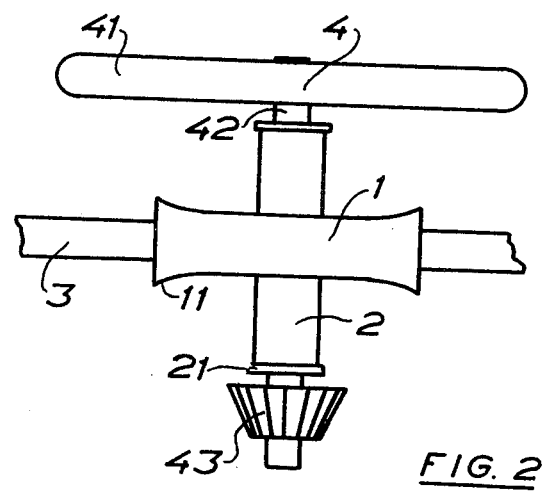

United States Patent [19]

Widigs

[11] 4,093,396
[45] June 6, 1978

[54] CHUCK KEY HOLDER

[75] Inventor: Sven Holger Widigs, Gustafs, Sweden

[73] Assignees: Lars Gosta Brandstrom; Karl Peter Brandstrom, both of Soderhamn, Sweden

[21] Appl. No.: 750,651

[22] Filed: Dec. 15, 1976

[30] Foreign Application Priority Data

Jan. 30, 1976 Sweden ................................ 7600992

[51] Int. Cl.² .............................................. B23B 45/00
[52] U.S. Cl. .................................. 408/241 R; 279/1 K
[58] Field of Search ....................... 279/1 K; 81/90 A; 408/241

[56] References Cited

U.S. PATENT DOCUMENTS

| 1,798,234 | 3/1931 | Toppin | 408/241 |
| 2,263,277 | 11/1941 | Schumann | 81/90 A |
| 2,592,094 | 4/1952 | Willenbring | 219/1 K |
| 2,880,008 | 3/1959 | Stoner | 81/90 A X |

Primary Examiner—Gil Weidenfeld

[57] ABSTRACT

Chuck key holder for electrically driven, cabled hand-tools with replaceable tools securable in a chuck, said key holder having a first collet-like part for attachment round the cable and, at an angle to it, a second collet-like part for rotatable attachment of the chuck key.

5 Claims, 2 Drawing Figures

CHUCK KEY HOLDER

The invention relates to a chuck key holder for electrically driven, cabled hand-tools with replaceable tools attachable in a chuck or the like.

When working with said cabled hand-tools, for example electric drilling or grinding machines, a chuck key is required for securing and changing tools. The chuck key may easily be lost if carried loose. To avoid this, the procedure is known of attaching the chuck key with a chuck key holder to the cable of the hand-tool.

The object of the present invention is to produce such a chuck key permitting rotatable attachment of the chuck key to said cable without possibility of its being lost or torn away, the chuck key being displaceable along the cable and having a form which does not damage the cable through said movement. At the same time, in the event of an exposed conductor in a damaged cable, the chuck key holder must not render the chuck key conductive. The chuck key holder must also be easy to manufacture and easily fittable.

This is achieved according to the invention principally by means of a chuck key holder characterized by a first collet part intended for attachment round the cable and connected to the first collet part and at an angle to it, a second collet part intended for rotatable attachment of the chuck key. It is also proposed according to the invention that the first and/or second collet part should have a slot for fitting it to the cable and chuck key. This slot should preferentially be narrower than the associated cable or chuck key shaft. The collet parts should in such case consist of an electrically insulating and slightly elastic material. The first and/or second collet part may, of course, be made without slot, which merely affects the method of fitting when the chuck key is secured in the chuck key holder and when the latter is fitted to the cable.

According to one embodiment of the invention the collet parts of the chuck key have their longitudinal axes perpendicular to one another. According to another proposal the two collet parts are joined together by means of a connecting piece.

A suitable method of integral manufacture of the two collet parts and, if required, of a connecting piece between them is injection moulding of plastic or mould curing of an elastomer.

According to another embodiment of the invention it is proposed that the collet part intended for attachment round the cable should diverge at its ends or that the collet part intended for the chuck key should be reinforced at its ends.

Figure 1:
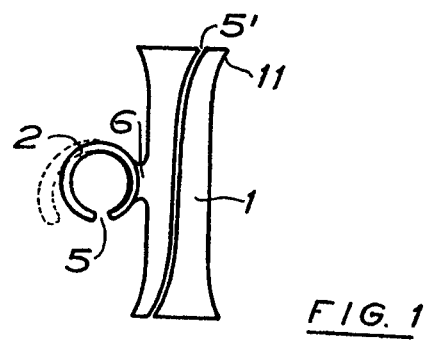

The invention will now be described with reference to an embodiment illustrated in the attached drawing, where FIG. 1 shows a chuck key holder viewed from the side and FIG. 2 a chuck Key holder with chuck key viewed from the front and fitted to a cable.

The chuck key holder according to the invention consists of a collet-like part 1 intended for attachment round a cable 3, which can be done by passing the cable through the part 1 either before the plug is attached to it or before the cable is fitted to an electrically driven hand-tool, for example a drilling machine. To said collet part 1 is attached via a connecting piece 6 a second collet-like part 2 intended for rotatable attachment of a chuck key, which in its entirety is denoted by 4. The attachment of the chuck key 4 in the collet-like part 2 can be simply done by the chuck manufacturer by passing the shaft 42 of the chuck key, with conical gear-wheel 43 secured to it, through the collet part 2 and from one end, then fixing the handle 41 of the chuck key to its shaft 42. Another way of fitting the chuck key in the holder is to form in the collet part 2 a slot 5 in its longitudinal direction, as shown in FIG. 1. The collet part 2 can then be bent up, as shown in FIG. 1 by a dotted line, the shaft 42 of the chuck key can be introduced from the side and the collet part 2 returned under spring action or mechanically to its original form, which ensures that the chuck key cannot be dislodged from collet part 2. The two collet parts 1 and 2 can either be joined directly together or via a connecting piece 6. If the collet parts 1, 2 are made of metal, they can easily be welded together, e.g. with their longitudinal axes perpendicular to one another. Another possibility is to manufacture the collet parts 1, 2, possibly with a connecting piece 6, by plastic injection moulding, so producing an insulating chuck key holder. The same applies when the holder is made by mould curing of an elastomer.

In the embodiment illustrated, furthermore, the collet part 1 for attachment round the cable 3 has diverging ends 11. A slot 5' in collet part 1 runs close to the connecting piece 6 along a helix with large pitch, but can of course also be made straight and lie on the side remote from collet part 2. Collet part 2 has bead-shaped reinforcements 21 at both ends to give good resistance to wear from the upper side of the conical gear-wheel 43 and the handle 41 of the chuck key.

According to the invention the chuck key is held securely to the cable and can be slid along the cable at will for ease of use in conjunction with change of tools. After change of a tool the chuck key is quite simply released and the holder slides along the cable to a position where it is out of the way. At the end of work, when the cable is usually wound round the drilling machine, the chuck key holder can be moved as far as the plug so as not to interfere with the winding of the cable. The invention also allows the chuck key holder to be made of electrically insulating material, so preventing the holder from becoming conductive in the event that cable damage with exposed conductor should unfortunately have arisen without the user's knowledge. The chuck key holder is also simple to manufacture and easily fittable. What we claim is:

1. A chuck key holder for releasably securing a chuck key to the electric cable of an electrically drivable hand tool comprising: a first tubular collet formed of a slightly elastic material and having a radial slot therein extending the axial length thereof, said first collet thus being elastically separable in the region of said slot for reception of an electric cable therewithin; and a second tubular collet formed of a slightly elastic material and having a radial slot therein extending the axial length thereof, said second collet thus being elastically separable in the region of said slot for reception of an element of a chuck key therewithin; said first and second collets being interconnected with their longitudinal axes angularly offset and spaced apart by at least the respective radius of each of said collets.

2. A chuck key holder according to claim 1, wherein the slot in at least one of said collets is a spiral slot.

3. A chuck key holder according to claim 1, wherein said collets are fabricated from an electrically insulating plastics material.

4. A chuck key holder according to claim 3, which has been molded in one piece.

5. A chuck key holder according to claim 1, wherein the opposed ends of said first collet are flared outwardly and the opposed ends of said second collet are provided with bead-shaped reinforcements.

* * * * *